United States Patent [19]

Rothberg

[11] 4,347,141
[45] Aug. 31, 1982

[54] PROCESS FOR REMOVAL OF RADIOACTIVE MATERIALS FROM AQUEOUS SOLUTIONS

[76] Inventor: Michael R. Rothberg, 8268 S. Locust St., Englewood, Colo. 80112

[21] Appl. No.: 168,009

[22] Filed: Jul. 14, 1980

[51] Int. Cl.³ ............................................... C02F 1/52
[52] U.S. Cl. .................................... 210/721; 210/724; 210/726; 210/738; 210/759; 210/912; 252/631
[58] Field of Search ........ 210/702, 717, 721, 723–728, 210/738, 759, 912; 252/631; 423/11, 12

[56] References Cited

U.S. PATENT DOCUMENTS

| | | | |
|---|---|---|---|
| 2,769,780 | 11/1956 | Clifford et al. | 210/724 |
| 2,852,336 | 9/1958 | Seaborg et al. | 423/12 |
| 2,873,169 | 2/1959 | Seaborg et al. | 423/12 |
| 3,013,978 | 12/1961 | Rosinski | 210/724 |
| 3,330,771 | 7/1967 | Komatsu et al. | 210/723 |
| 3,890,244 | 6/1975 | Carlin | 252/631 |
| 4,269,706 | 5/1981 | Sondermann | 210/682 |

OTHER PUBLICATIONS

Burbank et al., "A Study Of The Removal Of Radioactive Part. Matter From Water By Coagulation", U.S. Atomic Energy Comm., Sep. 1, 1955, T.I.S.E., Oak Ridge, Tenn., pp. 90–100.
Chemical Abstracts, vol. 74, 130150n, "Removal Of Soluble Radioactive Substances," 1969.

Primary Examiner—Peter A. Hruskoci
Attorney, Agent, or Firm—Gregg I. Anderson

[57] ABSTRACT

A process for removing dissolved radioactive materials from aqueous solution by adjusting pH of the solution to greater than 9.0 and incorporating approximately 80 to 100 mg/l of alum, lowering the pH of the solution to a range of between 5.5 and 7.0.

7 Claims, 2 Drawing Figures

PROCESS FOR REMOVAL OF RADIOACTIVE MATERIALS FROM AQUEOUS SOLUTIONS

BACKGROUND OF THE INVENTION

1. Field of Invention

This invention relates to a process for the removal of radioactive materials from aqueous solutions, and particularly the removal of relatively low concentrations of materials as might occur naturally or after highly contaminated waste water has been treated.

2. Description of the Prior Art

The Water Polution Control Act and Safe Drinking Water Act have imposed specific requirements on the quality of water discharged into streams and served to the public as potable water. As need increases, the regulations promulgated under both of these pieces of legislation will ultimately place more stringent requirements on both waste discharges and potable water purveyors. These requirements will include limits for radioactive materials, including uranium.

The primary sources for radioactive materials carried in solution are mining operations and certain nuclear fuel producing facilities. As more and more attention is given to the quality of life and technology's impact on society, as well as plant and animal life, the treatment of even these relatively low concentrations of radioactive materials becomes more important. For example, the Environmental Protection Agency has given the Colorado Department of Health a recommendation that dissolved uranium not exceed 0.015 mg/l. This is substantially less than concentrations of 0.18 to 2.3 mg/l occurring in natural flowing streams as a result of uranium mining operations.

The prior art has directed much attention to the reduction of high level concentration of radioactive materials and waste products resulting from the processing, production and decontamination of nuclear fission materials. Precipitation of the radioactive material from the solution is an often used part of these processes. U.S. Pat. No. 2,854,315 to Alter et al describes the treatment of a nitric acid solution contaminated by high level amounts of radioactive material by the addition of alkali metal hydroxides, which precipitates the radioactive wastes for later disposal. The removal of fission products, primarily from sea water, by precipitation is described in U.S. Pat. No. 3,013,978, to Rosinski. The process described relies on a mixture of precipitants, such as manganese dioxide or chromic oxide and ferric hydroxide, and the pH is allowed to vary widely. U.S. Pat. No. 2,766,204 to Lowe, specifies that the pH be held within a relatively narrow range of 3.6 to 4.4, by addition of an alkali hydroxide or an alkali carbonate, during a FeS precipitation process, which is conducted at low temperatures, about 0° C. The Lowe process also suggests initially adjusting the solution to a pH of 1.0 with nitric acid.

Direct precipitation of radioactive nuclear fission products from water by the addition of water soluble titanium compounds is disclosed in U.S. Pat. No. 3,330,771 to Komatsu et al. The dissolved radioactive cations along with the colloidal radioactive substances are coprecipitated and removed from solution.

Even more complex processes are used to treat waste water solutions, as disclosed in U.S. Pat. No. 3,008,904, to Johnson et al, wherein a phosphate, silicate or borate is added to the solution which is in turn entrained by a steam spray into a space heated to between 250° and 400° C. The residue is calcined and the water vapor and gaseous products separated.

Treatment of the water resulting from uranium ore processing, by evaporation and crystallization is shown in U.S. Pat. No. 3,988,414 to Klicka et al. Naturally occurring radioactive materials, including ruthenium and iodine, are mechanically filtered out of water to be used for drinking purposes, in an apparatus described in U.S. Pat. No. 3,405,050, to Bovard et al, embodying a series of stacked filters, one of the filters containing a resin for ion exchange with the radioactive materials.

Ion exchange has been widely used in radioactive waste water treatment. It is effective, but involves costly resins and decreases in efficiency as competing nonradioactive salts increase in concentration. Reverse osmosis, a process utilizing a membrane and high pressure energy intensive pumps to create a brine product, is likewise expensive and not readily adaptable to large city water treatment plants.

Few of the above described processes are directly applicable to small amounts of naturally occurring radioactive materials dissolved in aqueous solution. The processes that involve precipitation are generally directed at expensive less readily available, precipitating agents.

Conventional city water treatment processes do use alum as a coagulant during the treatment of the water. Relatively small amounts of alum, less than 10 mg/l, are added to form colloids, which have the physical property of adhesion. Flocculation of the suspended colloids allows various colloidal masses to agglomerate or adhere to each other and eventually settle to the bottom of a tank. This process is primarily directed to matter which is suspended in the water to be treated, rather than dissolved materials.

OBJECTS AND SUMMARY OF THE INVENTION

The principal object of the present invention is to provide a process for removing low level quantities of dissolved uranium and other radioactive materials from aqueous solutions, primarily drinking water.

A related object of the invention is to provide a process which can be conducted at naturally occurring temperatures and pressures.

A further object of the invention is to provide a process which is relatively fast and inexpensive.

Still a further object of the invention is to provide a process for removal of radioactive materials that can be incorporated in conventional city water treatment systems.

Another object of the invention is to produce an effluent containing very small concentrations of radioactive materials not presently required by governmental standards but which if not removed may in fact violate future more restrictive governmental standards.

Still a further object of the invention is to provide a process that can be used by city water treatment plants with little or no modification to existing facilities.

Another object of the invention is to provide a process which can be used as an industrial waste treatment process, such as for treating mine dewatering streams or uranium processing waste streams.

A further object of the invention is to provide a process that produces a precipitate that can be reprocessed conventionally to recover uranium and other radioactive materials.

In accordance with the objects of the invention, the process broadly involves precipitation of radioactive materials, primarily dissolved uranium, from aqueous solutions by adjusting the pH of the solution to greater than 9.0, and followed by the addition of alum ($Al_2(SO_4)_3$) to the adjusted pH solution. The contaminated water may be naturally occurring water, or an industrial water containing low level radioactive contamination, or the like. In the particular application contemplated, the contamination arises primarily from water runoff associated with a uranium mining operation in which uranium concentrations, calculated on the basis of dissolved uranium present, vary from about 0.18 mg/l up to about 2.3 mg/l.

The control of the pH of the solution prior to the incorporation of the precipitating agent chosen has been found to be critical to the removal of small amounts of radioactive materials. In using alum as a precipitating agent, the pH of the solution is first increased to above 9.0 while the solution is rapidly mixed for a period of above five minutes. Then 80–100 mg/l of alum in added during a shorter period, about one minute, of rapid mixing. The alum concentration added is such that the solution pH is lowered to an ideal value of 6.5 but in the range of between 5.5 and 7.0. Slow mixing or flocculation for twenty minutes is followed by clarification, which separates the precipitate from the finished water, and completes the process.

The process is conducted at ambient temperatures and atmospheric pressures. The process is specifically intended to be utilized in existing city water treatment facilities or industrial waste water treatment facilities.

Hydrogen peroxide has been found to act as an oxidant or catalyst in the reaction of the radioactive materials with alum, having the effect of lowering the concentration of alum required to achieve the desired pH.

DESCRIPTION OF THE PREFERRED EMBODIMENT

Figure 1:
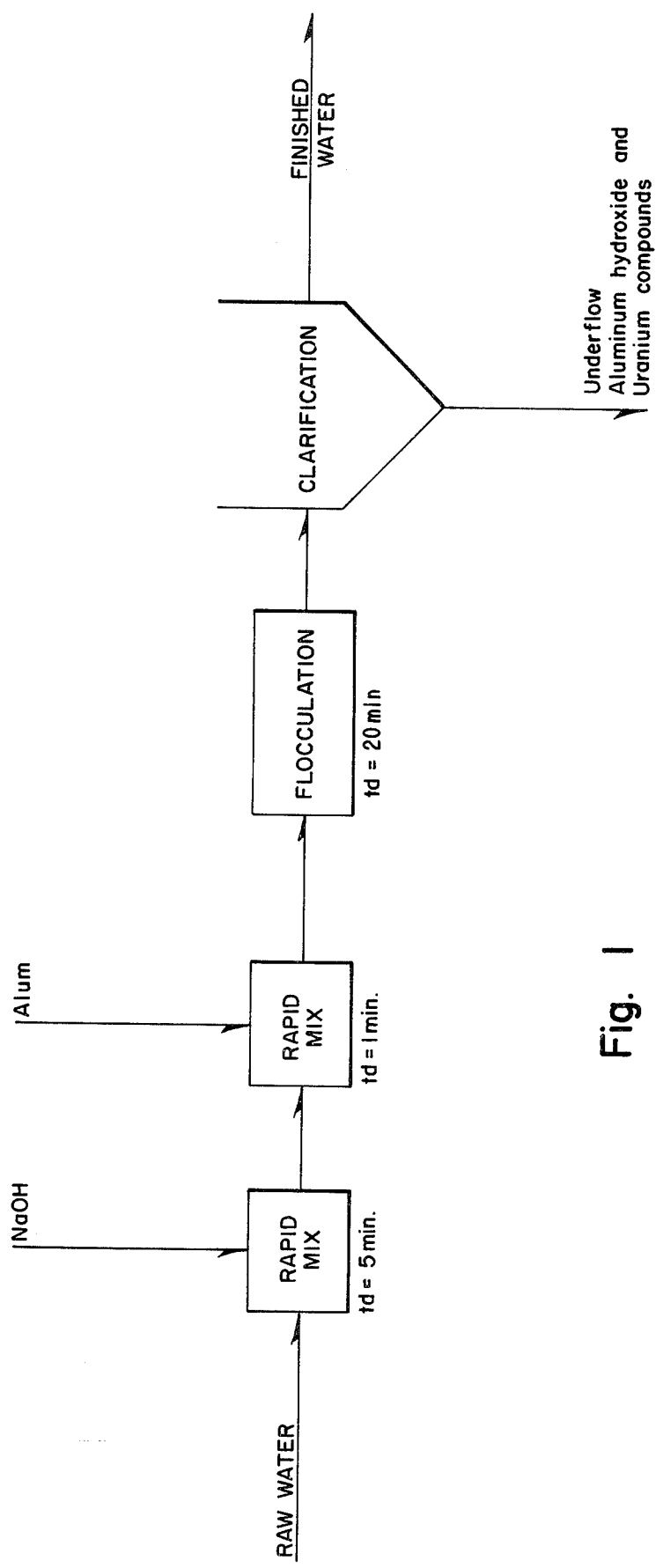
FIG. 1 is a flow chart of the process of the present invention.

The process of the present invention, a flow chart of which is shown in FIG. 1, is based on the precipitation of radioactive materials, particularly uranium, dissolved in aqueous solutions. The dissolved radioactive materials may be from a naturally flowing stream, or a uranium mining operation water treatment plant. The water from the stream is destined to be treated by a conventional city water treatment facility for drinking and home use.

In accordance with the present invention, an aqueous solution containing contaminates including dissolved uranium at levels of 0.18 to 2.3 mg/l is adjusted to a pH of greater than 9.0 by the addition of sodium hydroxide, during a rapid mix (100 r.p.m.) of the solution over a period of five minutes. Alum ($Al_2(SO_4)_3$) is then added in sufficient dosages (80–100 mg/l) to cause a precipitate to form and settle out of solution. The alum precipitating agent is desirably added during approximately one minute of rapid mixing of the entire solution. The process is effectively completed at ambient temperature and atmospheric pressure. A slow mix over a period of twenty minutes follows, during which flocculation takes place. During flocculation, small particles formed by the addition of the precipitating agent collect together in colloidal masses. The particles agglomerate together to the extent that their own size and weight allow the particles to settle out of solution, without filtering. After the precipitating agent had been added, during the rapid mixing of the solution, and slow mixing or flocculation is accomplished, the precipitate of aluminum hydroxide and uranium compounds is removed and the decant solution separated or clarified as finished water.

It has been found that pH control, both prior to and after incorporating the precipitating agent, is critical to obtaining a high percentage, over 90%, removal of dissolved uranium. It has been further discovered that a critical pH value in the range of 5.5 to 7.0 is achieved after the addition of alum to a solution having a preadjusted pH of greater than 9.0. Accordingly, the pH of the solution to be treated is adjusted to a value of greater than 9.0 by addition of NaOH or lime [$Ca(OH)_2$] over a period of about five minutes while rapidly stirring (100 r.p.m.) the solution. Alum, which is of acidic nature, is then added in sufficient dosages to achieve a final pH of about 6.5 during a one minute rapid mix of the solution, and the undesired uranium compounds are thereby precipitated and removed.

Figure 2:
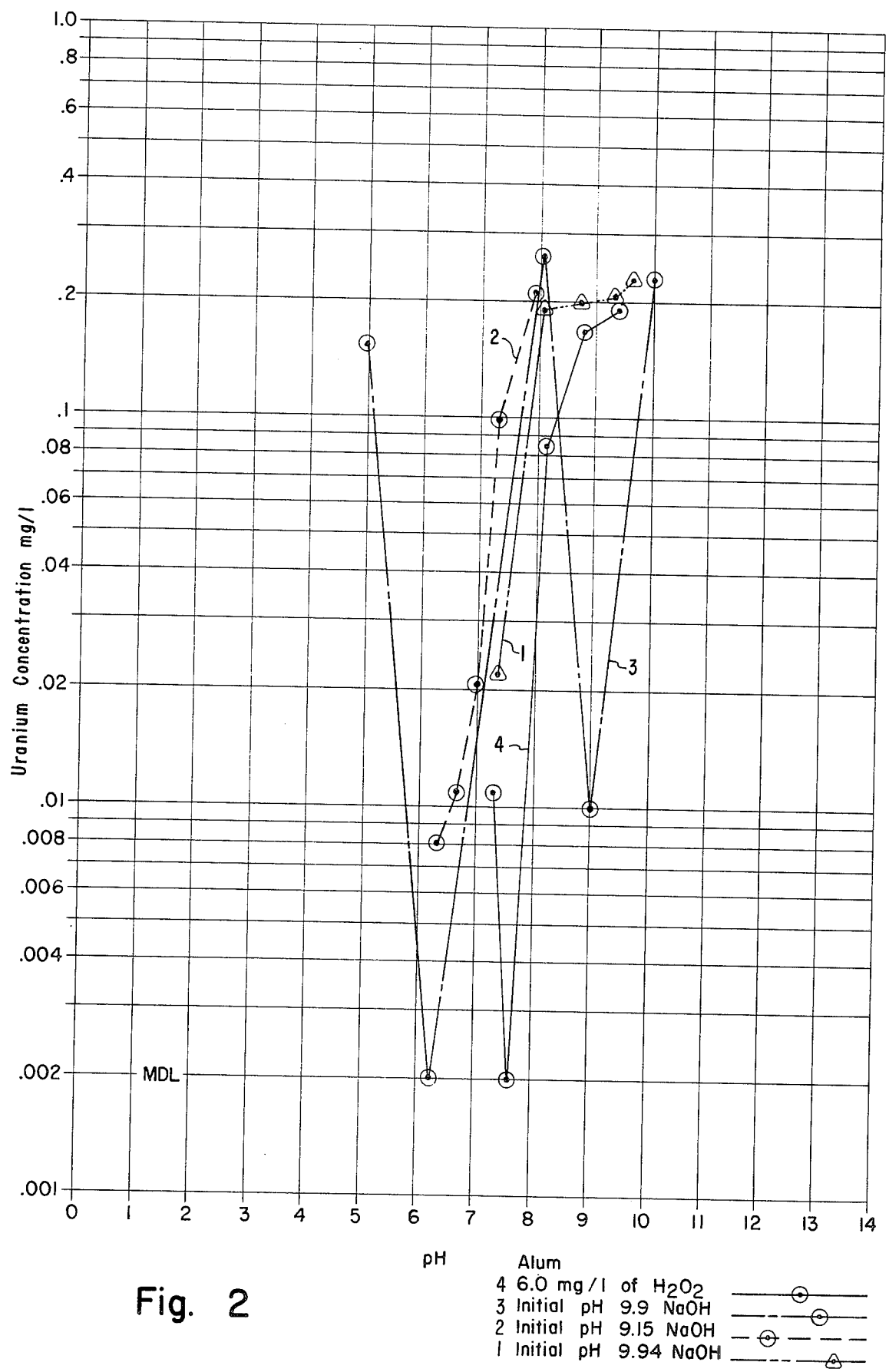
FIG. 2 is a graph of experimental results showing the effect of pH on removal of uranium as a result of the alum process of the present invention.

The relationship between pH and final dissolved uranium concentration is shown in FIG. 2. Four curves are shown in FIG. 2 representing four different sets of experimental data obtained from an aqueous solution having approximately 0.23 mg/l of dissolved uranium, among other characteristics, and adjusting the pH to above 9.0 by the addition of sodium hydroxide and progressively raising the dosage of alum from 20 mg/l to 100 mg/l in 20 mg/l increments. In curve 3, no set alum dosage was added, rather alum was incrementally added and corresponding pH measured. At each incremental increase in alum dosage, the solution was analyzed for dissolved uranium concentration. Curves numbered 1 through 3 represent the results of this experimental data, while curve 4 shows the effect of the addition of hydrogen peroxide on the final pH.

Referring now to curve 1, it will be seen that the initial pH was adjusted to 9.94 by the addition of sodium hydroxide. Additional dosages of alum up to 80 mg/l did not significantly lower the uranium concentration in the solution. However, a dramatic drop-off in uranium concentration occurred when a dosage of 100 mg/l was incorporated into the solution. The solution of curve 2 was adjusted to a pH of 9.15 with sodium hydroxide. The addition of alum was immediately detectable in the level of uranium concentration measured. The addition of 40 mg/l dropped the uranium concentration from approximately 0.2 mg/l to approximately 0.1 mg/l, a fifty percent removal. The data points for 80 mg/l and 100 mg/l of alum lower the dissolved uranium to less than 0.015 mg/l. Curve 3 has an initial pH of 9.9. The second incremental dosage of alum appears to drop the dissolved uranium concentration significantly. However, the point at pH 9.0 and uranium concentration of 0.01 mg/l, is a deviant point. The third incremental dosage of alum incorporated on the solution shown in curve 3 has virtually no effect on the uranium concentration of the solution. However, the solution of curve 3 at the fourth incremental dosage shows a drop in uranium concentration to the minimum detectable limit (MDL), 0.002 mg/l of dissolved uranium. After the fourth dosage of alum, the dissolved uranium concentration is not significantly affected.

The conclusion drawn from the data represented in FIG. 2 is that a final pH of approximately 6.5 gave the highest removals of dissolved uranium. A range of pH 5.5 to 7.0 results in a final dissolved uranium concentration on the order of 0.015 mg/l. This pH corresponds to a dosage of approximately 80 to 100 mg/l of alum. Another conclusion that can be drawn from the data represented in FIG. 2, is that an initial pH of greater than 9.0, but still as close as possible to 9.0, gives an initial alum dosage of as little as 40 mg/l much more effect than where the pH is well above 9.0. In curves 1 and 3, where the pH was almost 10.0 prior to the addition of alum, relatively low dosages of alum, 60 mg/l or less, had virtually no effect on dissolved uranium concentration.

It is of course understood that the alkalinity and pH of the solution itself dictate the initial pH. If the initial pH were over 10.0, for example, a higher dosage of alum would be needed to correct the pH to slightly over 9.0 and then reach the final range of between 5.5 and 7.0.

It has been found that where the initial pH is less than 9.0, the amount of dissolved uranium remaining in solution is not significantly affected by the addition of alum, whatever the dosage, even if the pH range of 5.5 to 7.0 is achieved. It is therefore critical that the pH be adjusted to above 9.0 before the process achieves significant removal of dissolved uranium.

In an alternative embodiment, the addition of hydrogen peroxide, which might be characterized as an oxidant, but may in fact act as a catalyst, to the precipitation reaction taking place, further affects the removal of uranium from the mine water. Curve 4 of FIG. 2 represents the affect of hydrogen peroxide at a concentration of 6.0 mg/l on the alum process at dosages of 20 to 100 mg/l of alum.

Hydrogen peroxide at a concentration of 6.0 mg/l was determined to give the most effective results over other concentrations. As seen in FIG. 2, the addition of 6.0 mg/l of hydrogen peroxide in solution affects the pH at which optimum removal of dissolved uranium occurs. The addition of hydrogen peroxide raises the final pH from 6.5 for optimum removal of dissolved uranium to approximately 7.5, corresponding to 80 mg/l of alum. The range of pH, in which dissolved uranium of less than 0.015 mg/l remains in solution, is between 7.0 and 8.0. Use of 6.0 mg/l of hydrogen peroxide allows for smaller dosages of alum, on the order of 80 mg/l, to be used as compared to the straight alum process, which achieves the best results at approximately 100 mg/l of alum.

Table I shows an analysis of an aqueous solution from a uranium mine dewatering stream. The solution was prefiltered through a 0.45 micron filter to insure that only dissolved materials were present for analysis. A range of concentrations for the elements forming the solution is shown in Table I based on various analyses taken. The ranges also reflect two sampling points, one at the end of the uranium mine waste water treatment plant, the other at a stream into which the treated uranium waste water flows. For uranium, the higher concentrations occur at the treatment site, the lower uranium concentrations occur at the stream where additional water has diluted the treated water.

TABLE I

| Parameter | Characteristics of Aqueous Solution | |
|---|---|---|
| | Concentrations | Units |
| Turbidity | .37–1.0 | JTU |
| pH | 7.0–8.6 | |
| Specific Conductance | 400–600 | $\mu$mho/cm |
| Hardness | 38–120 | mg/l as $CaCO_3$ |
| Alkalinity | 85 | mg/l as $CaCO_3$ |
| Aluminum | .18–.35 | mg/l |
| Barium | .034–.989 | mg/l |
| Calcium | 11–40 | mg/l |
| Chlorides | 23–360 | mg/l |
| Chromium | .002–.010 | mg/l |
| Copper | .006–.195 | mg/l |
| Iron | .062–.52 | mg/l |
| Lead | .001–0.010 | mg/l |
| Magnesium | .97–2.2 | mg/l |
| Manganese | .003–.058 | mg/l |
| Nickel | .001–.008 | mg/l |
| Phosphate | 0.03 | mg/l |
| Potassium | 2.8 | mg/l |
| Sodium | 30.5 | mg/l |
| Sulfate | 215–925 | mg/l |
| Strontium | .303–1.2 | mg/l |
| Uranium | .18–2.3 | mg/l |
| Alpha | 160–1200 | pCi/l |
| Beta | 122–1300 | pCi/l |

It is believed that a clear understanding of the process of the present invention will be gained by referring to the following examples.

EXAMPLE 1

An aqueous solution obtained from the treated uranium waste water, at ambient temperature and pressure, as shown in Table I, was adjusted to a pH of 9.1 by the addition of approximately 6.0 mg/l of sodium hydroxide under conditions of rapid mixing (100 r.p.m.) for approximately two minutes. The resulting solution was then carefully adjusted to a pH of 6.4 by the addition of approximately 100 mg/l of dry alum during one minute of rapid mixing. The solution was slowly mixed (20 r.p.m.) for approximately twenty minutes. The precipitate was allowed to settle under quiescent conditions for five minutes. The decant solution was removed, filtered and analyzed for dissolved uranium, alpha and beta activity. The results of this analysis for a high uranium concentration solution obtained from the uranium waste water after treatment are shown in Table II.

TABLE II

| Parameter | Initial Value | Final Value |
|---|---|---|
| Uranium | 2.3 mg/l | 0.21 mg/l |
| Alpha | 1120 ± 40 pCi/l | 103 ± 13 pCi/l |
| Beta | 1300 ± pCi/l | 72 ± pCi/l |

EXAMPLE 2

The steps shown in Example 1 were repeated on an aqueous solution taken at the stream into which the treated uranium waste water flows, i.e. the lower concentration of uranium of Table I. The results of this analysis for a low uranium concentration solution obtained from the stream are shown in Table III.

TABLE III

| Parameter | Initial Value | Final Value |
|---|---|---|
| Uranium | 0.20 mg/l | 0.011 mg/l |
| Alpha | 160 ± 10 pCi/l | 8.4 ± 2.3 pCi/l |
| Beta | 122 ± pCi/l | 8 ± 10 pCi/l |

EXAMPLE 3

An aqueous solution obtained from the treated uranium waste water, at ambient pressure and temperature, as shown in Table I, was adjusted to a pH greater than or equal to 9.1 by the addition of approximately 6.0 mg/l of sodium hydroxide. To this solution, 6.0 mg/l of $H_2O_2$ was added at a rapid mix (100 r.p.m.) for two minutes. The resulting solution was then carefully adjusted to pH 7.0 by the addition of approximately 80 mg/l of dry alum, added during approximately one minute of rapid mixing. Following approximately twenty minutes of slow mixing (20 r.p.m.) the resulting precipitate was allowed to settle. The decant solution was removed, filtered and analyzed for dissolved uranium and alpha activity. The results of this analysis for a high uranium concentration solution obtained from the uranium waste water after treatment are shown in Table IV.

TABLE IV

| Parameter | Initial Value | Final Value |
|---|---|---|
| Uranium | 2.3 mg/l | .04 mg/l |
| Alpha | 1100 ± 40 pCi/l | 25 ± 6 pCi/l |

EXAMPLE 4

The steps shown in Example 3 were repeated on an aqueous solution taken at the stream into which the treated uranium waste water flows, i.e. the lower concentration of uranium of Table I. The results of this analysis for a low uranium concentration solution obtained from the stream are shown in Table V.

TABLE V

| Parameter | Initial Value | Final Value |
|---|---|---|
| Uranium | 0.20 mg/l | .002 mg/l |
| Alpha | 120 ± 13 pCi/l | 4.0 ± 1.7 pCi/l |

EXAMPLE 5

An aqueous solution taken at the stream into which uranium waste water flows, at ambient temperature and pressure, as shown in Table I, was adjusted to pH greater than or equal to 9.1 by the addition of approximately 10 mg/l of hydrated lime. To this solution approximately 100 mg/l of alum was added to carefully reduce pH to 6.3. The preceding steps were done during two minutes of rapid mixing (100 r.p.m.). Following approximately twenty minutes of slow mixing (20 r.p.m.) for flocculation, the precipitated solids were quiescently settled for five minutes. The decant solution was then removed, filtered and analyzed for dissolved uranium, alpha and beta activity. The results of this analysis are shown in Table VI.

TABLE VI

| Parameter | Initial Value | Final Value |
|---|---|---|
| Uranium | 0.20 mg/l | 0.01 mg/l |
| Alpha | 160 ± 10 pCi/l | 4.1 ± 1.7 pCi/l |
| Beta | 122 ± 13 pCi/l | 10 ± 10 pCi/l |

It can be seen from the examples that not only is uranium, and its associated alpha particle emissions level lowered, but beta particle emissions, resulting from radioactive material other than uranium, are also lowered. Thus it can be seen that the process has an effect on other radioactive materials besides uranium.

Adjusting the pH of the solution to just over 9.0 is critical to obtaining the described final dissolved uranium concentration on the order of 0.015 mg/l. The aqueous solutions having high concentrations of dissolved uranium, Examples 1 and 3, were not lowered to the 0.015 mg/l of dissolved uranium range by a single cycle of the process, even though significant amounts of uranium were precipitated out. A second cycle of the process of the invention on the decant solution would bring the uranium concentration to the desired level, as seen in Examples 2 and 4.

Although the present invention has been described with a certain degree of particularity, it is understood that the present disclosure has been made by way of example and that changes in detail may be made without departing from the spirit of the invention.

What I claim is:

1. A process for decontaminating a water solution having contained therein naturally occurring radioactive materials, said solution containing dissolved uranium and having both alpha particle and beta particle activity and a pH of about 7.0–8.6, comprising the steps of:

adjusting the pH of the solution to greater than 9.0 and less than 10.0 while simultaneously rapidly mixing said solution;

adding approximately eighty to one hundred milligrams per liter of alum while simultaneously rapidly mixing said solution for a period of at least 1 minute, thereby lowering the pH of the solution to between 5.5 and 7.0;

slowing mixing said solution for a period of about twenty minutes to thereby form a precipitate containing aluminum hydroxide and said dissolved uranium in said solution; and separating said precipitate from the solution.

2. The invention defined in claim 1 wherein the solution has an alpha particle activity level of between one hundred sixty and twelve hundred pico curies per liter and a beta particle activity level of between one hundred twenty-two and thirteen hundred pico curies per liter.

3. The invention defined in claim 1 wherein said solution has a dissolved uranium concentration of between 1.8 and 2.3 milligrams per liter.

4. The process as defined in claim 1 wherein the adjusting of the pH is made by the addition of sodium hydroxide to the solution.

5. The process as defined in claim 1 further including the step of incorporating simultaneously with the addition of alum approximately 6.0 milligrams per liter of hydrogen peroxide.

6. The invention as defined in claim 1 wherein the steps of the process are repeated until less than 0.015 milligrams per liter of dissolved uranium remains in solution.

7. The invention as defined in claim 1 wherein the first pH adjustment of greater than 9.0 and less than 10.0 is to a pH of 9.1.

* * * * *